United States Patent [19]
Lin

[11] Patent Number: 5,639,524
[45] Date of Patent: Jun. 17, 1997

[54] RAY-SHIELD SHEETS FOR GLASS SURFACE ADVERTISEMENT AND ART EXHIBITION

[76] Inventor: Frederick Tsun-te Lin, 1572 Diablo Point Ct., Chula Vista, Calif. 91911

[21] Appl. No.: 749,958

[22] Filed: Aug. 26, 1991

[51] Int. Cl.⁶ .................................................. B60J 3/00
[52] U.S. Cl. .................... 428/35.2; 428/31; 428/100; 296/97.1; 296/97.3; 296/97.7; 296/97.9
[58] Field of Search .............................. 428/31, 35.2, 100; 296/97.1–97.9

[56] References Cited

U.S. PATENT DOCUMENTS

| | | | |
|---|---|---|---|
| 2,632,669 | 3/1953 | Piwczynski | 296/97.7 |
| 3,254,435 | 6/1966 | Rix | 296/97.7 |
| 3,649,069 | 3/1972 | Zip | 296/97.7 |
| 4,202,396 | 5/1980 | Levy | 296/97.7 |
| 4,647,102 | 3/1987 | Ebrahimzadeh | 296/97.8 |
| 4,727,920 | 3/1988 | Siegler | 296/97.8 |
| 4,736,980 | 4/1988 | Eubanks | 296/97.7 |
| 4,773,696 | 9/1988 | Steele | 296/97.7 |
| 4,794,025 | 12/1988 | Yamanaka | 428/31 |
| 4,805,955 | 2/1989 | Levy | 296/97.1 |
| 4,872,721 | 10/1989 | Sniadach | 296/97.2 |

*Primary Examiner*—Ellis Robinson
*Assistant Examiner*—Rena L. Dye
*Attorney, Agent, or Firm*—Gilliam, Duncan & Harm

[57] ABSTRACT

This invention relates in general to sheets or films which are instantly mountable and dismountable to the surface of the glass for the use of the window advertisement, window art exhibition or heat and/or sun ray inhibitive media, or more particularly to a sheet of linen cloth including knitted fabric, or a sheet of printed or painted paper or film and if necessary, for sheets made of weak material, they could be adhesively taped or pasted to the surface of a transparent resilient sheet, whereby the linen cloth or printed or painted paper or film or resilient sheet are in turn mounted onto, or dismounted from, the surface of the window by means of cap-tapped or tube-tapped suction cups, weight bags and elasto sheet retaining rings.

12 Claims, 16 Drawing Sheets

Section 101-a

Section 101-b

Section 102

Section 103

Section 104

View 106

RAY-SHIELD SHEETS FOR GLASS SURFACE ADVERTISEMENT AND ART EXHIBITION

FIELD OF SEARCH

| U.S. Patent Documents | | | |
| --- | --- | --- | --- |
| 237,663 | 10/26/1973 | Levy | DS/139 |
| 3,003,812 | 6/16/1960 | Haugland | 296/97R |
| 4,202,396 | 5/13/1980 | Levy | 160/84RX |
| 4,607,875 | 12/10/1984 | McGirr | 296/97D |
| 4,606,572 | 7/8/1985 | Maguire | 296/95R |
| 4,647,102 | 3/3/1986 | Ebrahimzadeh | 296/97D |
| 4,652,039 | 11/5/1985 | Richards | 296/97R |
| 4,671,334 | 3/19/1986 | Yadogar/Aframian | 160/84R |
| 4,671,558 | 8/13/1986 | Cline | 296/97R |
| 4,794,025 | 12/8/1987 | Yamanaka | 428/31 |
| 4,727,920 | 3/17/1987 | Siegler | 160/84R |

SUMMARY OF THE INVENTION

There are many different sun shields and sunshades available for building/house windows or vehicle windshields. For the building/house windows, these shields are normally permanently fixed as the part of the accessories of the building/house such as a window curtains and therefor not easily detachable. For the vehicle windows, such units are usually very ugly looking when installed, since the folded pattern of the bulky card board and inadequate support of the card board against the windshield tend to create large gaps between the card board and the windshield. When a sheet is taped or pasted directly to the surface of the window or windshield, it will loose its flexibility of instantaneous detachability and remountability, thus it could hardly be used as a vehicle sun shield or flexibly changeable advertisement agent or art exhibitor.

It is therefore, a principal object of the invention to provide a light sheet with means of easy mounting and detachment capabilities onto or from the surface of the window or windshield such that said sheets do not appear ugly in appearance when installed because of its unique design of close attachment to the surface of the window or windshield, thus fulfilling the purpose of the object of advertisement or neatness as an art exhibition or effective means to act as a sun shield and heat inhibitive or conservation media.

Another object of this invention is to provide a sheet, light and flexible enough for easy installation and exchange for the advertisement and art exhibition and to provide a constant easy mountability as a sun shield or a heat inhibition/conservation shield.

A further object is to make these sheets either easily rolled or foldable to a relatively small compact package for their storage.

Features of invention useful in accomplishing the above objects include, a ray-shield sheet, suction cups, tapping caps or tapping tube, Velcro attached weight bags and elasto sheet retaining rings. The ray-shield sheet consists of linen cloth including knitted fabric or a paper or a film which has an advertisement or an art picture printed or painted or knitted on its surface, with the surface contacting and facing towards the interior side of the window or the windshield when the sheet is made of weak material, a transparent resilient sheet will be used to hold the weak sheet by means of pasting or taping such that the printed art picture or advertisement of weak material sheet could be clearly visible from the surface of the transparent resilient sheet while there are holes adequately spaced around its periphery and/or at the critical central locations of the primary ray-shield sheet to receive the insertion of the stem of the suction cups and the tapping caps, with suction cup consisting of a center stem having an eye hole at the tip of the suction cup stem, which will be used for passing the threads sewed directly to the linen cloth or knitted fabric ray-shield whenever no tapping cap or tapping tube is required, wherein a tapping cap or tapping tube shall cap the suction cap stem after the insertion of the stem of the suction cup to the hole of the ray-shield sheet, thus holding the ray-shield sheet close to the surface of the window by means of friction force of the tapping cap lips or tapping tube, tapping cap or tapping tube being made of resilient material with a cylindrical cap or tube inner diameter sized to make a tight fit to the stem diameter of the suction cup and can press holding by shear force resistance on the stem of the vacuum suction cup which hold the ray-shield sheet preventing falling down against the gravitational force when the suction cup is pressed against the window surface causing the vacuum condition and therefore acting as the basic supporting foundation to the attachment of the said sheets, wherein, the Velcro attached weight bags could be used where the bottom margin of the window has not enough space to receive the suction cups such as the case for the automobile windshield where the windshield makes a sharp angle vertically against the connecting horizontal dashboard surface creating the situation of virtually impossibility attachment of the suction cups on the bottom portion of the windshield wherein the Velcro attached weight bags are fist size made of linen cloth. The inside of the bag being filled with heavy small size steel balls or stone cobbles while the outer surface of the bags having a piece of Velcro male strip sewed or adhered by the adhesive media, would hold tight the bottom margin of the ray-shield sheet by means of pieces of female Velcro strip which are adhered sporadically at the bottom portion of the primary ray-shield sheet by the adhesive media when pressed and held by the male and female mating of the Velcro strips as the primary ray-shield sheet is stretched and installed with supporting attachments of the suction cups, and tapping caps or tapping tube at the top margins of the primary ray-shield sheet, wherein the primary ray shield sheet could be made of a transparent resilient material which holds by pasting or tapping a short length secondary ray-shield sheet of weaker material and is sized long enough to be rolled at the both left and right ends in the horizontal direction, where several elasto sheet retaining rings could be inserted around the rolled portion of the transparent resilient ray-shield sheet to hold the rolled portion making further expansion possible, thus providing a rigidity as a vertical column to support itself when attached to the window or windshield by means of the vacuum suction cups and tapping caps or tapping tube and Velcro attached weight bags, wherein the elasto sheet retaining rings being made of metal or rigid plastic material with a voltex ring shape but having two directing leaves, one coming out from the ring spirally alter 380 degrees turn into the tangential direction at one side, and the other comes out from zero degree beginning point of voltex ring extended to guide the sheet in the same direction as the other leaf with a reinforcement plate being met at the end of the leaf plate and bent toward and jointed to the near center diameter of the voltex ring which forms a triangular shape, thus be able to direct the primary sheet toward the parallel direction of the window surface through the opening space between the leaves while a suction cup stem mating ring with a tight fitting size diameter to the suction cup stem constructed at the back side of the directing leaf plate to receive a suction cup stem when installed on the vehicle windshield with the vacuum cups, the tapping caps or the tapping tube, and/or the Velcro attached weight bags.

DETAIL DESCRIPTION OF THE PREFERRED EMBODIMENT

Figure 1:
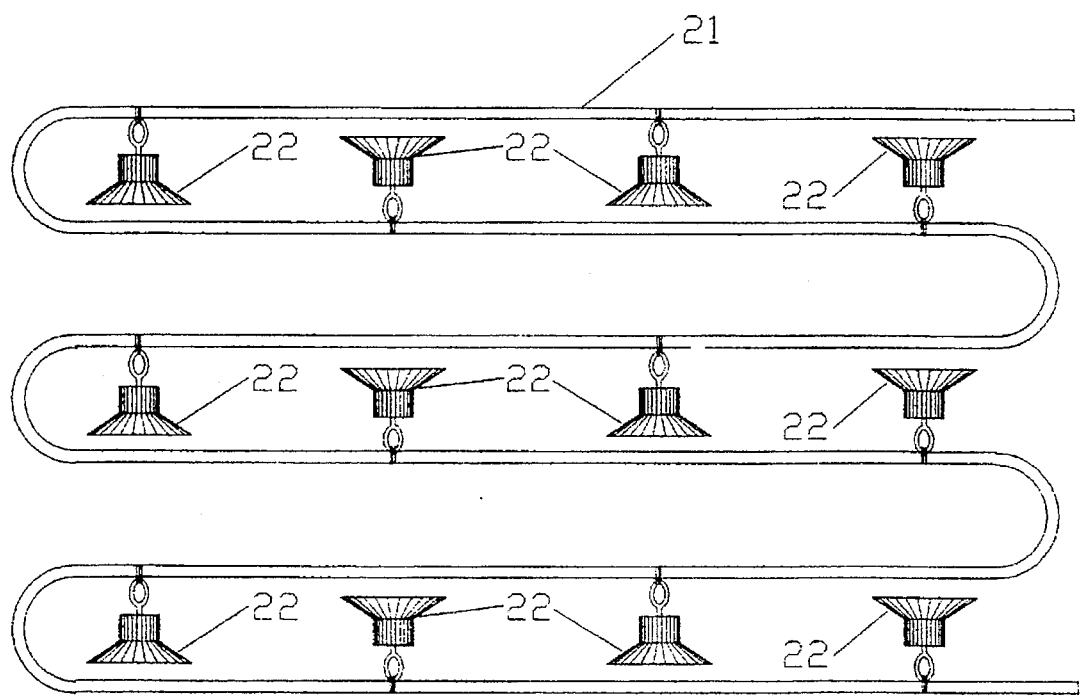
FIG. 1 represents a perspective view of the ray-shield sheet under loosely folded position with suction caps sewed onto it.

The subject invention and its various objects and aspects may become more readily apparent from the following detailed description of preferred embodiments thereof, illustrated by way of example in the accompanying drawings in which:

FIG. 1 represents a perspective view of the ray-shield 21 formed of resilient material in a folded state with serval eye stemmed suction cups 22 sewn together (illustrated). Ray-shield 21A is formed of a soft material and includes removable rather than fixed in place suction cups 22 and tapping cups 26 or tapping tube 26B.

Figure 2:
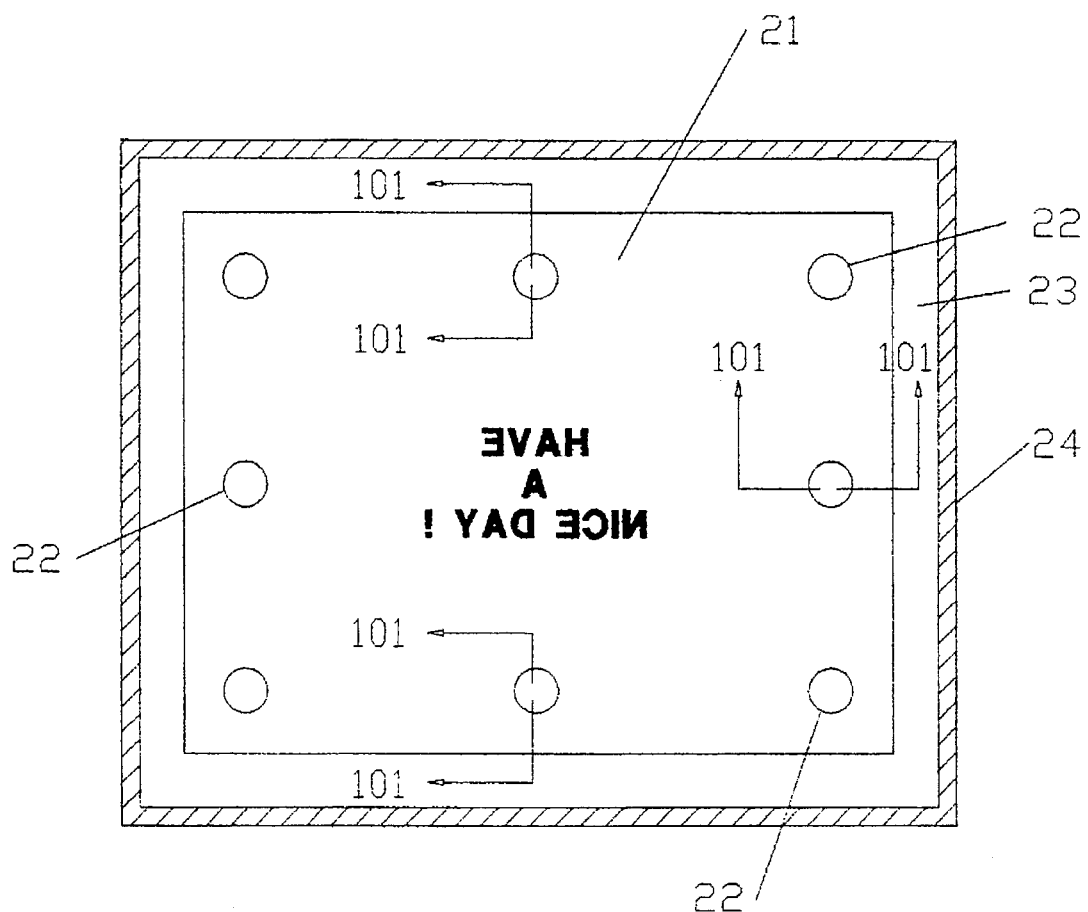
FIG. 2 is a perspective view of the ray-shield sheet looking outward of the window.

FIG. 2 is a perspective view of the ray-shield sheet 21,21A,21A' in the opened installation position for use within a building/house window 23 within the window frame 24.

Figure 3:
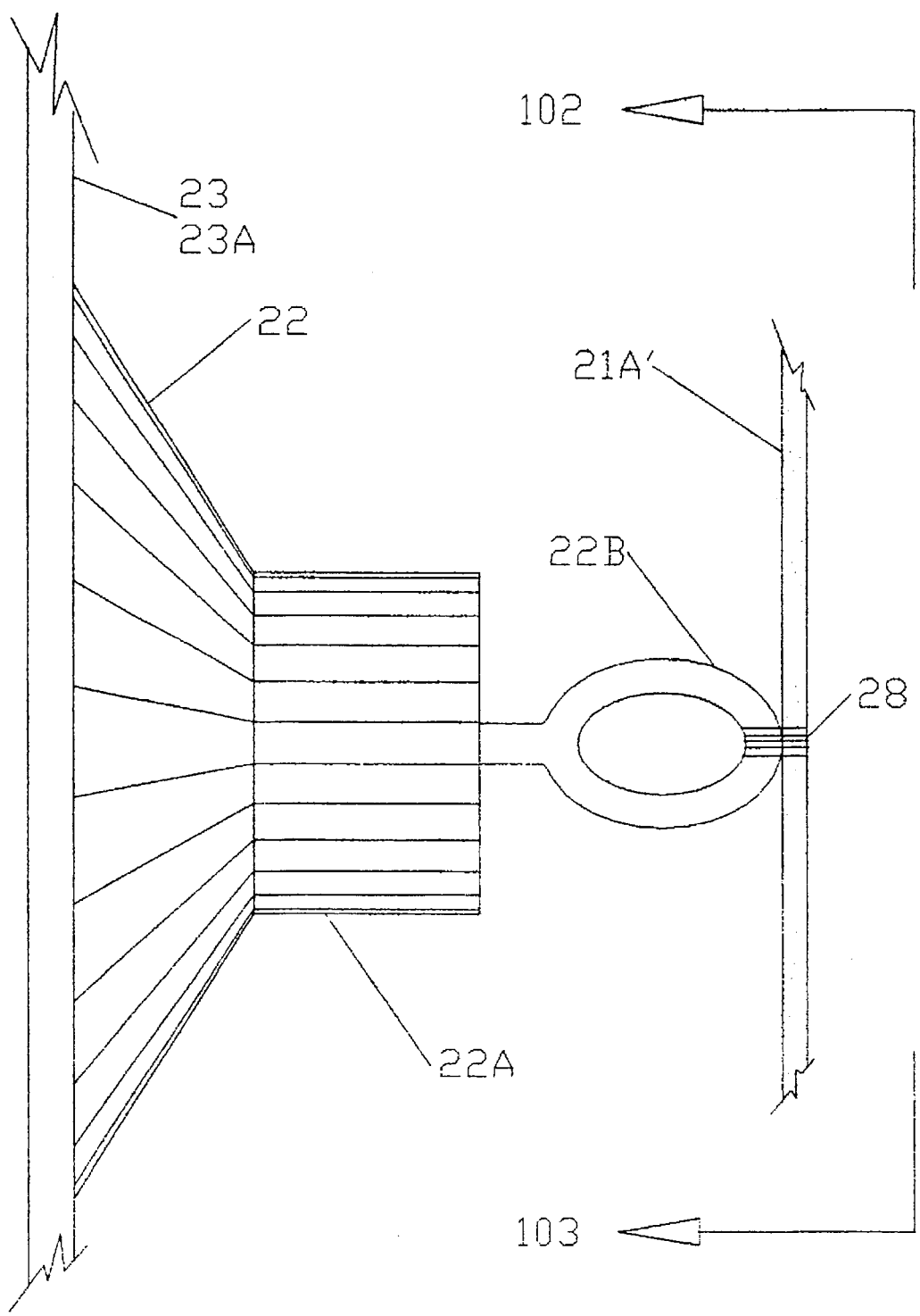
FIG. 3 shows a partial cross sectional view of a linen cloth ray-shield sheet sewed with a suction cap being applied onto a surface of a glass window.

FIG. 3 is a section view 101 at the suction cup 22, with stem eye 22B to be used for passing the threads sewing directly to the ray-shield sheet 21A'. The ray-shield 21A' is made of linen cloth.

Figure 4:
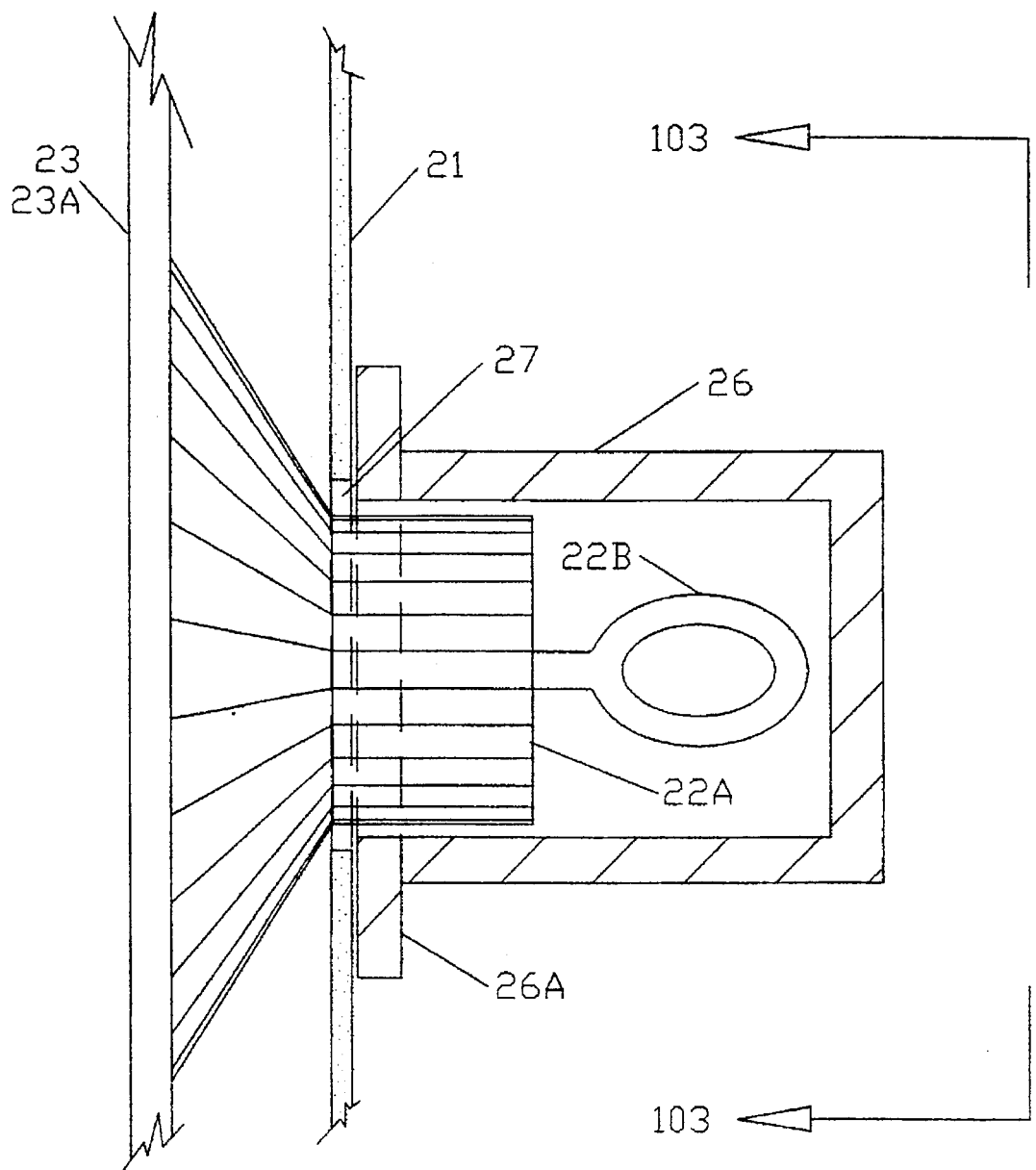
FIG. 4 depicts a partial cross section of a ray-shield sheet with attachments of a suction cap and a tapping cap being applied onto the surface of a glass window.
Figure 4A:
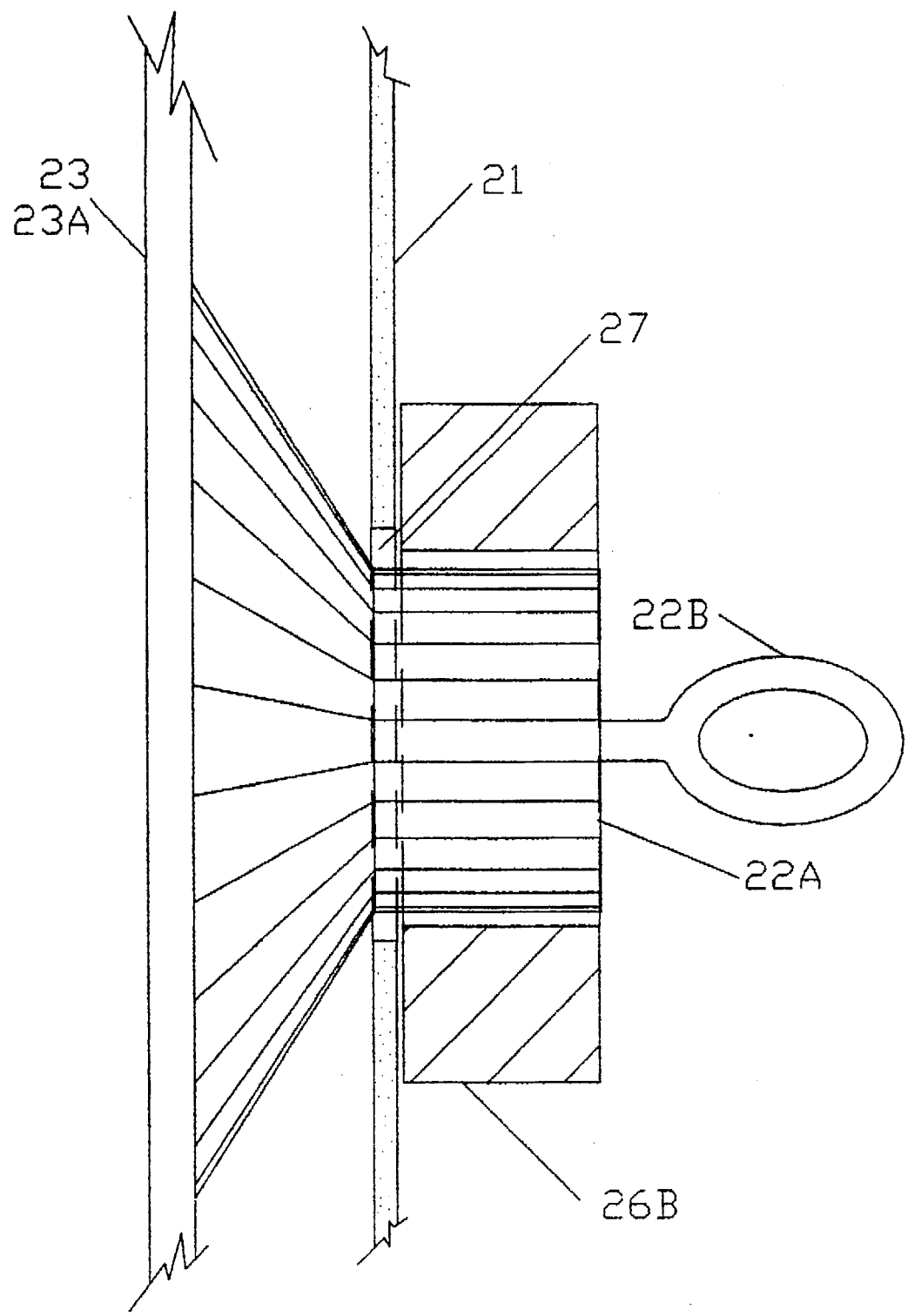
FIG. 4A is the same as the FIG. 4 except a tapping tube is illustrated in lieu of the tapping cap.
Figure 5:
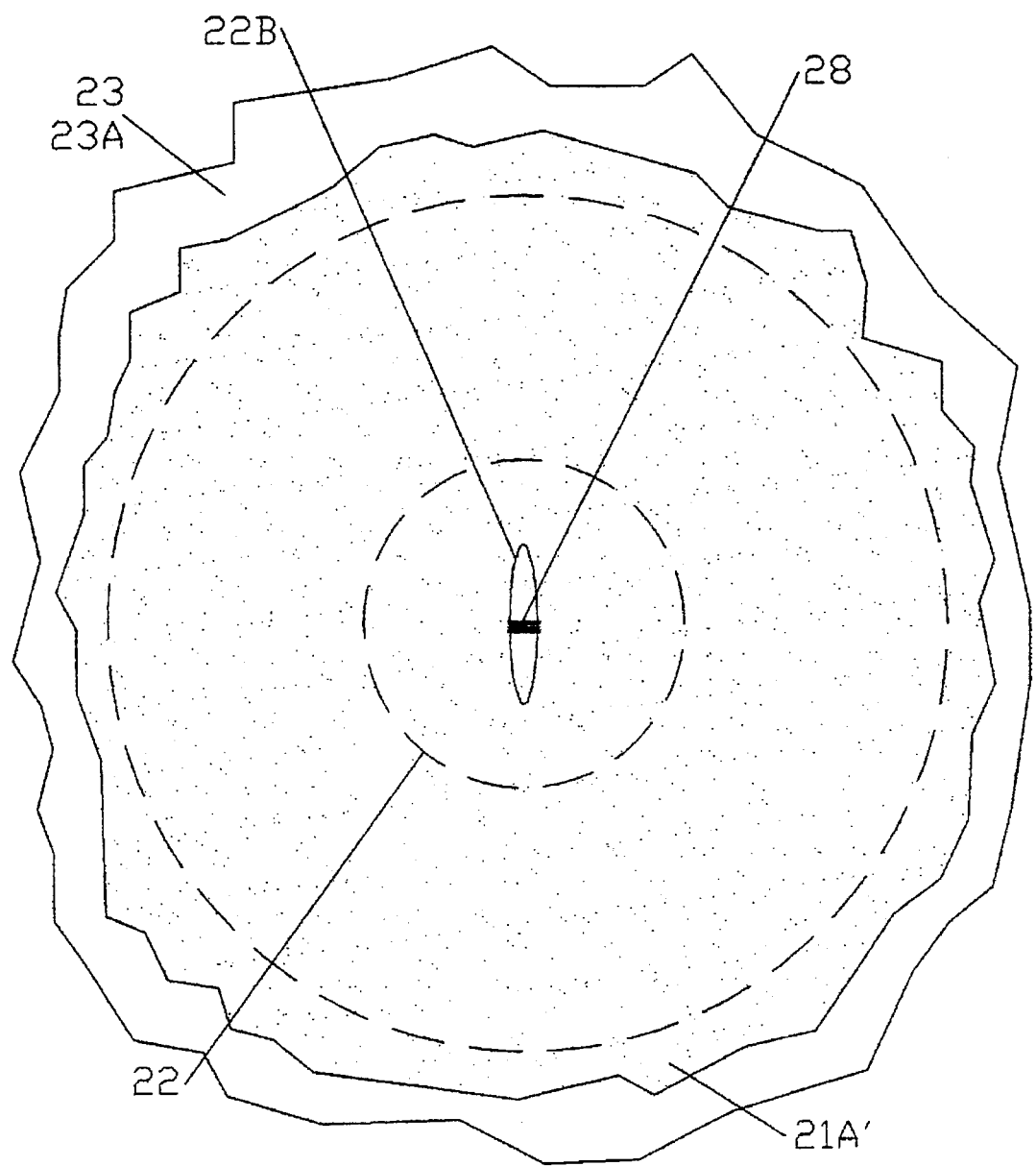
FIG. 5 represents the partial rear view of the linen cloth ray-shield sheet with an eye stemmed suction cup attachment.

While FIG. 4 represents the same view as section 101 except the suction cup stem 22A is penetrating through the holes 27 of the ray-shield sheet 21 and is covered by a tapping cap 26, which has a diameter to tightly mate with the diameter of the vacuum suction cup stem 22A, with a wide tapping cap circular lip 26A designed purposely to hold down the ray-shield sheet 21 toward the surface of the window glass 23 or 23A. FIG. 4A is the same as FIG. 4 except a tapping tube 26B is used in lieu of tapping cap 26, wherein the tapping tube 26B is made of plastic or resilient material tight fit to the stem of the suction cup with tube thickness being sufficiently big enough to function as a tapping cap circular lip so that it can hold the ray-shield sheet 21 toward the surface of the window glass 23 or 23A. FIG. 5 shows the rear view of the ray-shield sheet 21 depicted as section 102 of FIG. 3 where the suction cup 22 has a stem eye 22B being sewed by threads 28 to the ray hield linen-cloth 21A' so that the ray-shield linen cloth 21A' and the suction cup 22 becomes inseparable.

Figure 6:
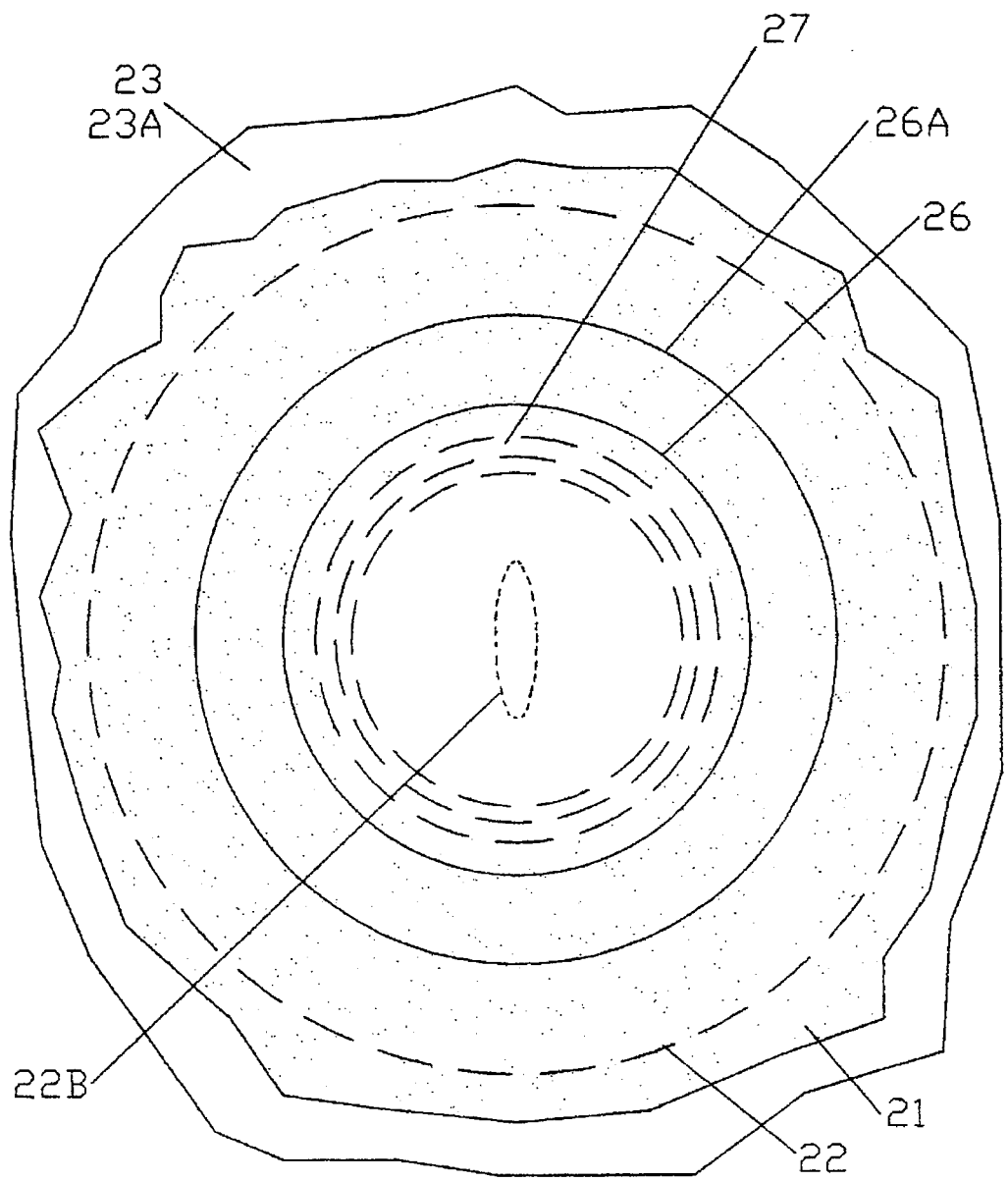
FIG. 6 shows the partial rear view of the ray-shield sheet with tapping cap and suction cup attachments.

FIG. 6 is the rear view of the ray-shield sheet 21 depicted as the section 103 of FIG. 4 where the ray shield 21 is punched with holes 27 slightly greater than the stem diameter of the suction cup 22A but smaller than the lip diameter of the tapping cap 26A or outer diameter of the tapping tube 26B. When the ray-shield 21 is installed to the window 23 or 23A by means of pressing the tapping cap 26 or tapping tube 26B towards the window glass 23 or 23A, the lip of the tapping cap 26A or the structure of tapping tube 26B would hold the ray shield 21 as close to the surface of the window glass 23 or 23A since the tapping cap is mating with the vacuum suction cup stem 22A which goes through the holes 27 of the ray-shield sheet 21.

Figure 7:
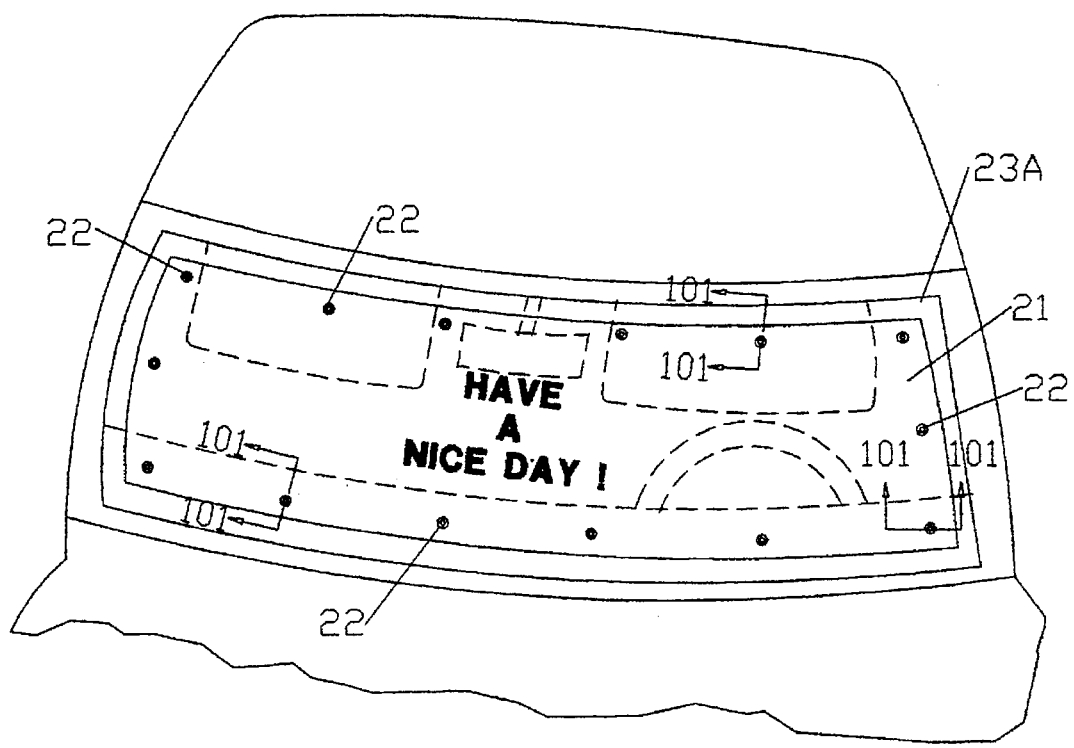
FIG. 7 represents a perspective view of the ray-shield sheet applied to the interior windshield of an automobile.

FIG. 7 shows the perspective view of the ray-shield sheet applied to the interior windshield of an automobile where both FIG. 3 and FIG. 4 or FIG. 4A configuration for the blown-up detailed sections are applicable for this illustration.

Figure 8:
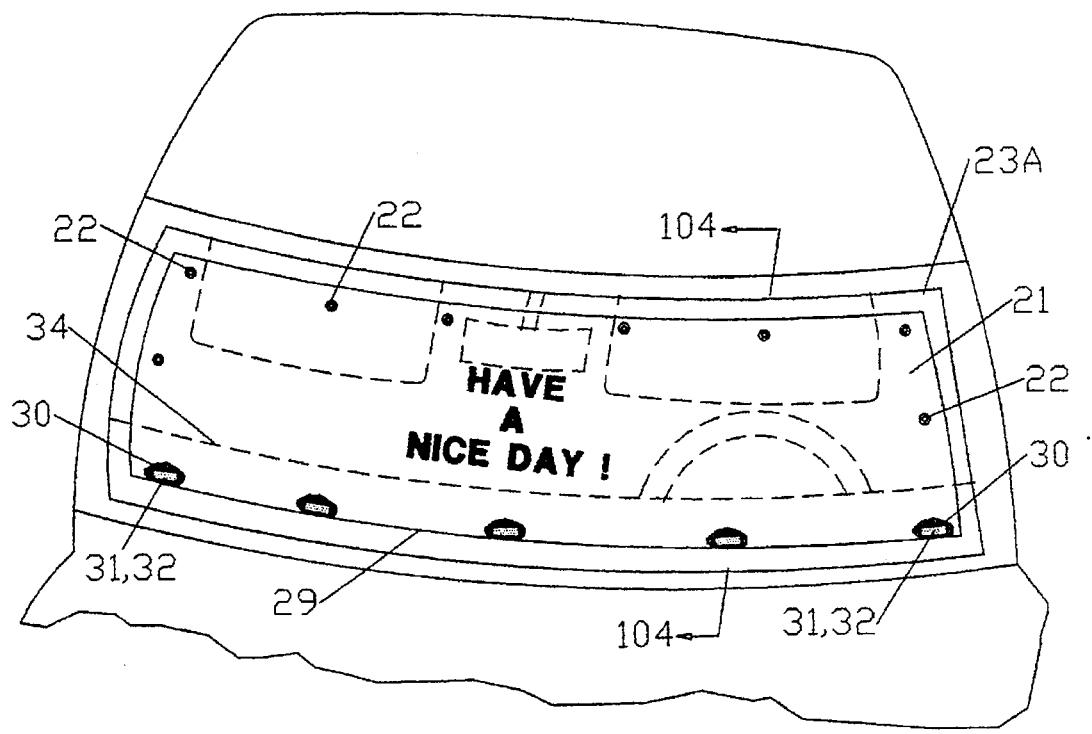
FIG. 8 is similar to FIG. 7 except a dashboard surface of the automobile is shown which renders the application of the Velcro attached weight bags in lieu of suction cups to hold the bottom margin of ray-shield sheet in position.
Figure 9:
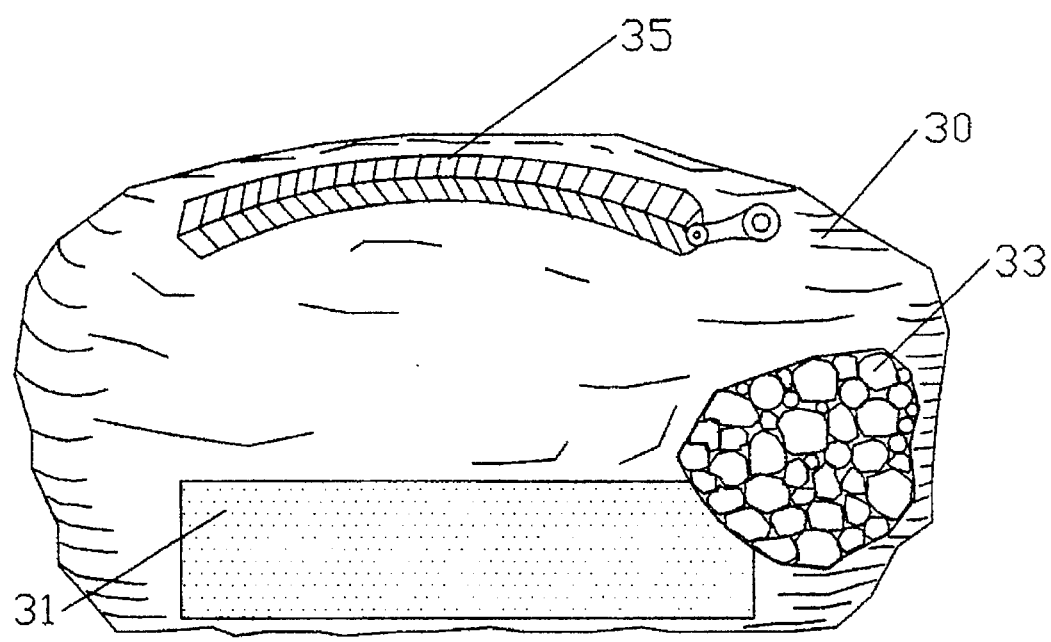
FIG. 9 shows the detail of a Velcro attached bag.
Figure 10:
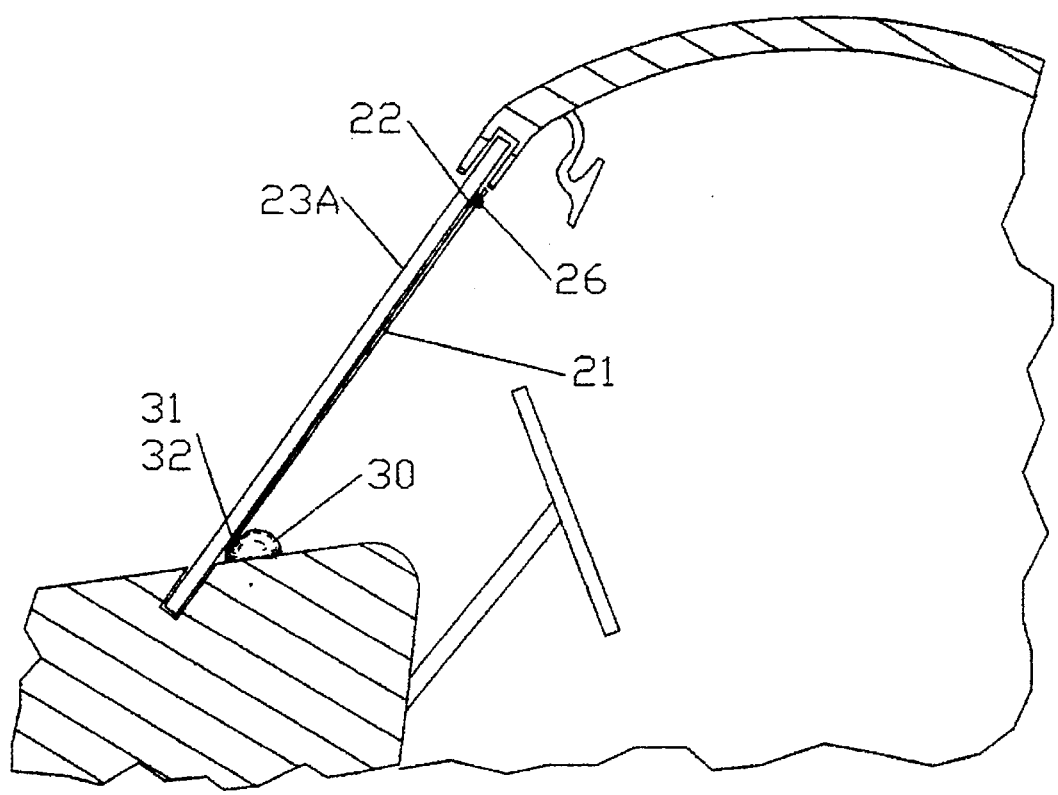
FIG. 10 depicts a cross sectional view of an automobile windshield where the Velcro attached bags are used at the bottom margin of the ray-shield sheet on a steep surface of a dashboard.

FIG. 8 shows the perspective view of the ray shield sheet 21 applied to interior windshield of an automobile where the dashboard surface 34 has a sharp angle against the windshield glass 23A which is more clearly illustrated at the side cross sectional view 104 in FIG. 10. In this case, it is apparent that application of the vacuum suction cup 22 at the lower margin 29 of the ray shield 21 becomes virtually impossible task due to the limitation in the space availability. In such a case, a Velcro attached weight bags 30 are used as depicted in FIG. 9, wherein hook (male) Velcro is sewn or pasted adhesively to the surface of a weight bag, made of fist size cloth in which some weight chips 33 made of iron balls, or beans or cobles are filled and zipped (35) inside the bag making the bag flexible to adjust to the surface condition of the dashboard when affixed to an eye (female) piece of Velcro 32 which are adhesively attached or sewn to the rear surface of ray-shield sheet 21.

FIG. 10 shows the cross sectional view 104 of FIG. 8 of automobile windshield where the ray-shield sheet 21 is attached and held to the interior of the windshield 23A by means of vacuum suction cups 22 at the top margin of ray-shield 36 and Velcro attached weight bag 30 at the bottom margin 29 of ray-shield sheet.

Figure 11:
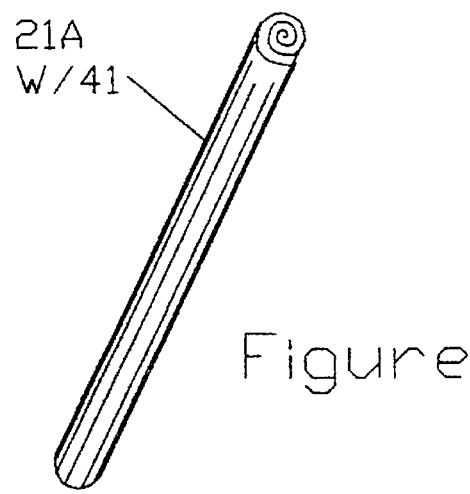
FIG. 11 is a perspective view of a doubled layered ray-shield sheets in a compact rolled form for storage, consisting of a long length transparent resilient primary ray-shield sheet on which a secondary ray-shield sheet made of a weak material has been taped or pasted.

FIG. 11 is a perspective view of the double layered ray-shield sheets in the rolled compact form with suction cups 22 and tapping caps 26 removed. Double layer ray-shield sheets are constituted of a primary ray-shield sheet 21A which attaches to the glass surface by means of suction cups, and a secondary ray-shield sheet 21B which can not sustain itself without being pasted onto primary ray-shield sheet 21A.

Figure 12:
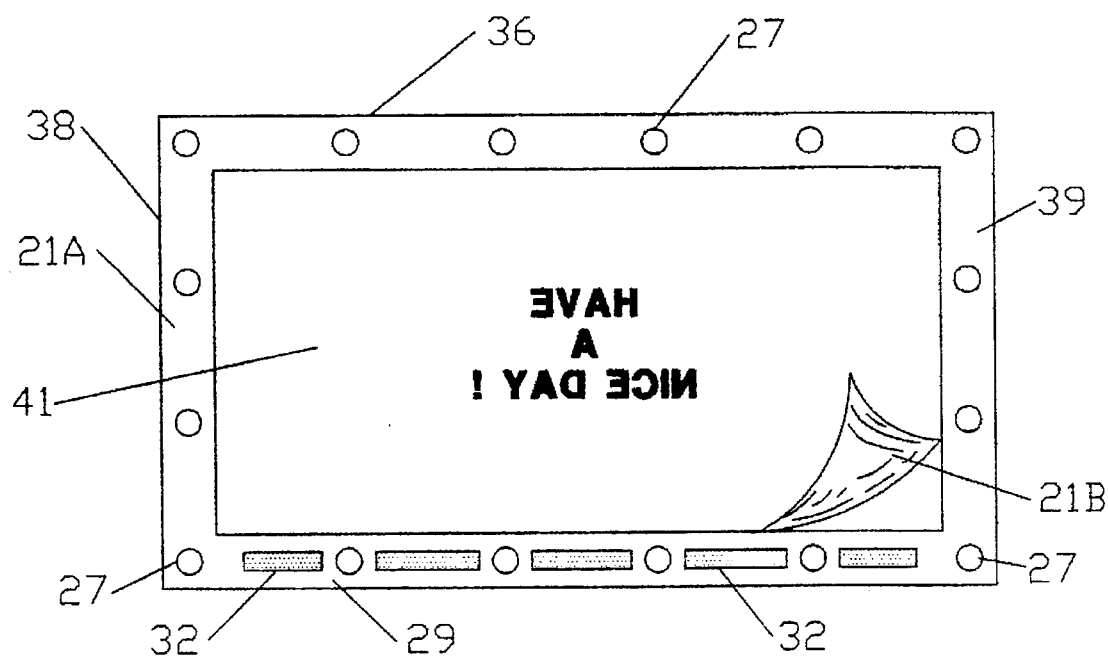
FIG. 12 is a perspective rear view of the short length doubled layer ray-shield sheets in the opened flat format with holes for suction cups as well as female Velcro strip attachments at the bottom margin of the ray-shield sheet.

FIG. 12 is a perspective rear view of the double layer ray-shield sheets in the opened flat position wherein the adequate holes 27 slightly larger than the diameter of the vacuum cup stem but smaller than the diameter of tapping cap lip 26A or the outer diameter of tapping tube 26B, are punched ground the upper margin 36, lower margin 29 and left margin 38 and right margin 39 of the primary ray-shield 21A which is made of transparent resilient plastic material while the secondary ray-shield sheet 21B is taped or pasted facing with the advertisement surface of the secondary ray-shield sheet 21B attaching to the rear surface of the primary ray-shield 21A. In addition some female Velcro strips 32 are spaced intermittently attached by means of adhesive at the bottom margin of the ray-shield sheet 29 so that it could be used to mate with the male Velcro strips 31 of the Velcro attached weight bags 30 when used at a steep surface of an automobile dashboard 34.

Double layered ray-shield sheet is installed to the building/house window or automobile or vehicle windshield as illustrated in FIG. 2 and FIG. 7. In case the windshield of the vehicle is making the steep angle against the dashboard, the Velcro attached weight bag as illustrated in FIG. 9 is used in lieu of suction cups and tapping caps at the lower margin of ray-shield 29, in the same fashion as illustrated in FIG. 10, wherein the male Velcro 31 of weight bag will stick to the female portion 32 of the Velcro which is adhesively attached to the rear surface of the primary ray-shield sheet 21A. The weight bag 30 will hold the primary ray-shield sheet 21A at the lower margin of the windshield by the weight chips 33 normally consisting of the iron balls, cobles or beans when the primary ray-shield sheet is pulled in tension and held on the top margin 36 and side margins 38 and 39 of the primary ray-shield sheet using the tapping caps 26 or tapping tube 26B and suction cups 22.

In the case of an automobile windshield, the primary ray-shield 21A could be long enough such that it could be rolled at least two circles within the ring diameter of the elasto sheet retaining ring 42 at each left 38 and right 39 margins of ray-shield 21A, such that it would become a stiffened column at both ends of the ray-shield due to its own elastic expansion force against the clamping boundary of the elasto retaining rings 42.

Figure 13:
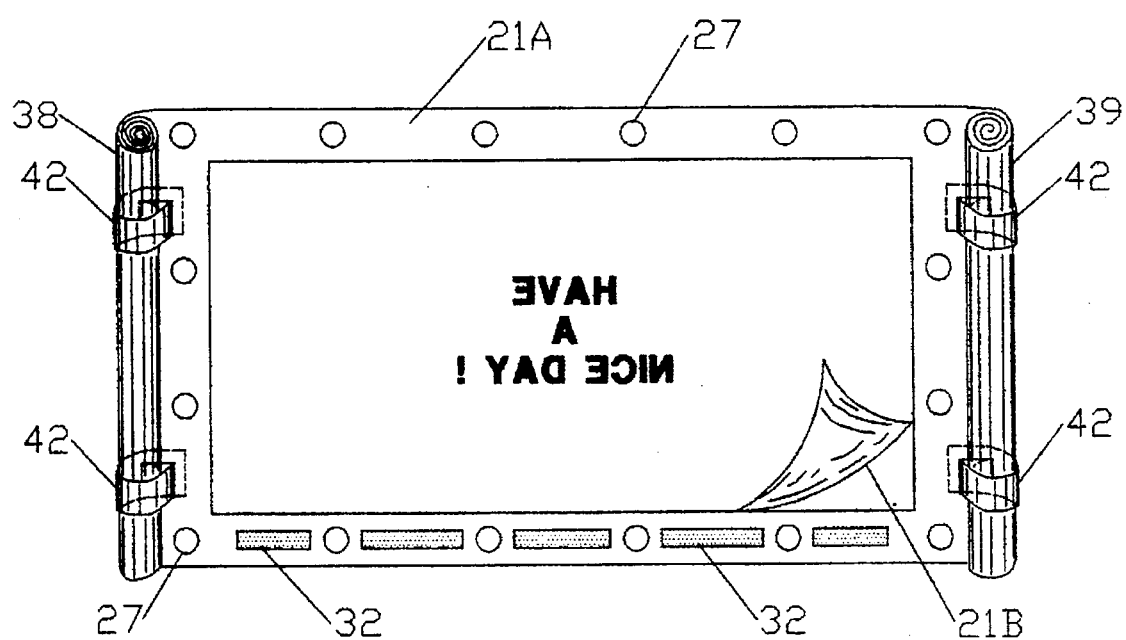
FIG. 13 is a perspective rear view of the doubled layer ray-shield sheet with a lengthened ends of transparent resilient ray-shield sheet rolled up into forming a stiff column at each end which is in turn clip-held by insertion into the elasto sheet retaining ring.
Figure 14:
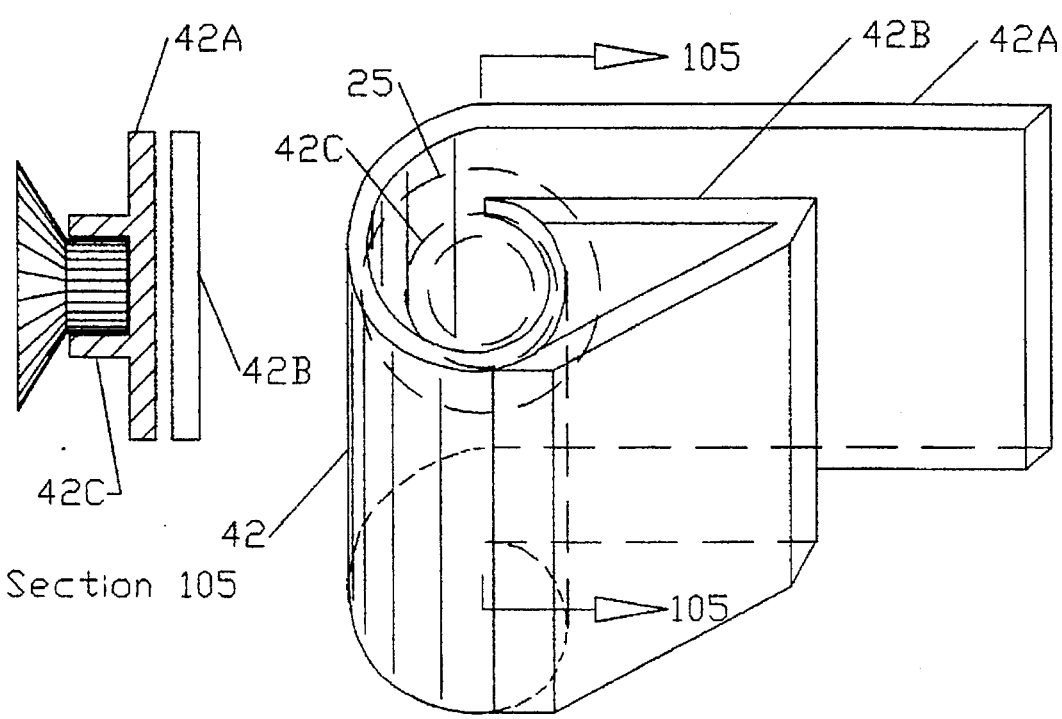
FIG. 14 depicts a detail of elasto sheet retaining ring.

FIG. 13 is the perspective view of the double layered ray-shield sheets in an opened position with a long primary shield 21A rolled at both ends and held by four elasto sheet retaining rings 42. The detail of elasto sheet retaining ring is shown in FIG. 14, which is made of resilient/plastic material forming a concentric voltex wherein the ends of voltex is extended into a leaf plate 42A of 360 degree parallel direction to the expanding surface of the ray-shield sheet with a guiding triangular leaf plate 42B such that it would provide a guide spacing for the ray-shield sheet to take a close attachment of the ray-shield sheet to the windshield as possible. At the flat surface of directing leaf plate 42A of the elasto retaining ring, a stub ring 42C is constructed uniquely with the surface of the leaf plate for the purpose of a tight fit mating into the male stem of the vacuum cup 25.

Figure 16:
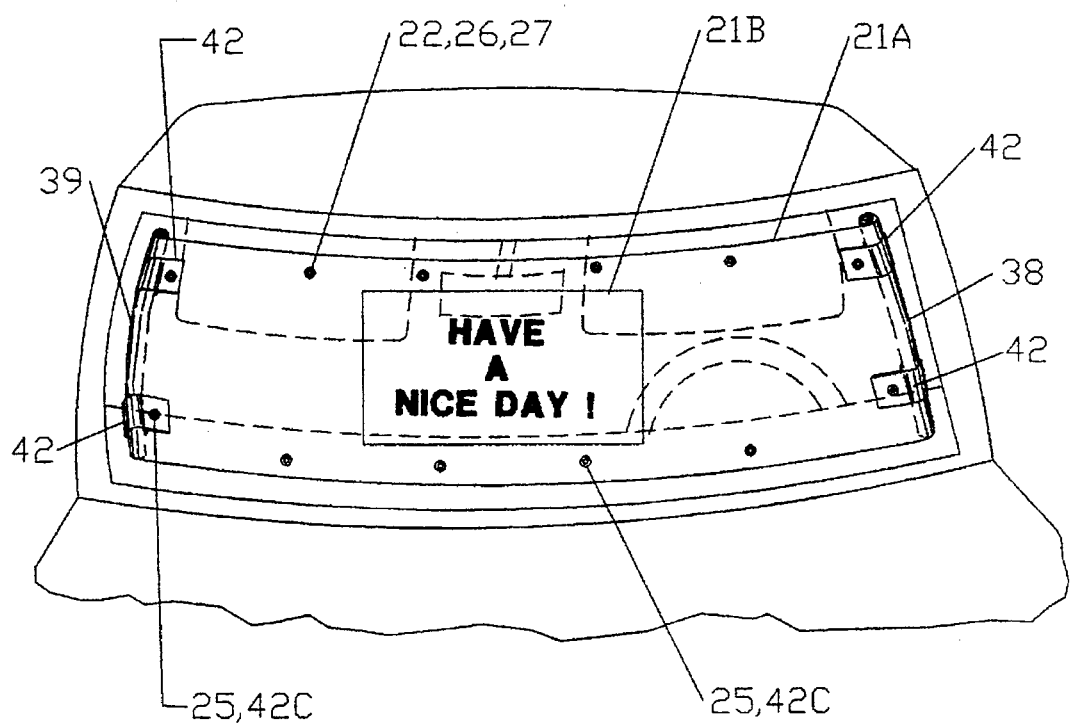
FIG. 16 shows the perspective view of the automobile windshield where a double layered ray-shield sheets with rolled up end condition.

FIG. 16 shows the perspective view of the primary ray-shield sheet 21A with an advertizement surface of the secondary ray-shield sheet 21B taped or pasted onto the rear surface of the primary ray-shield 21A so that once installed into the windshield of the vehicle, one can see the surface of the advertisement or art display of the secondary ray-shield sheet 21B from the outside of the vehicle, wherein the ends of primary ray-shield sheet 21A are rolled to the closed edge line of the windshield.

Figure 15:
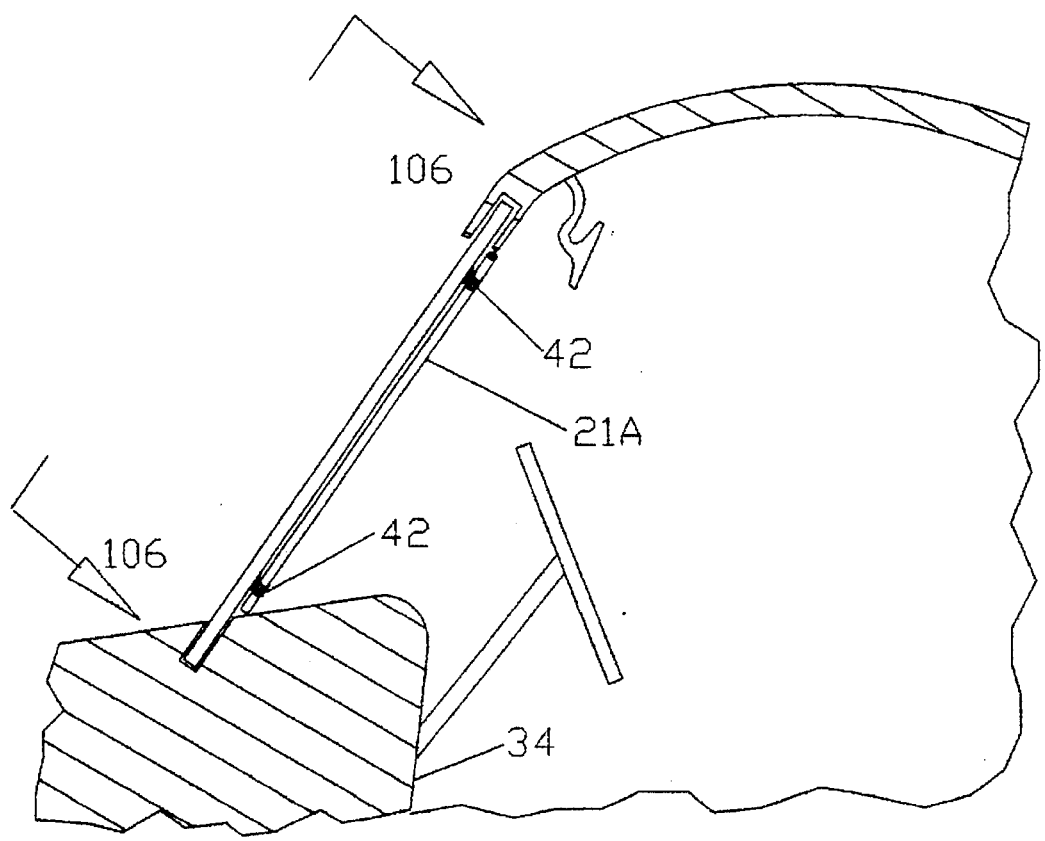
FIG. 15 shows the cross sectional view of an automobile where a double layer ray-shield sheet being applied and held by rolled up rigid column of transparent resilient primary ray-shield with a couple of elasto sheet retaining ring attachment suction cups sucking against the windshield.

FIG. 15 shows the cross sectional view of the automobile windshield where the ends of primary ray-shield sheet able form a rigid column bounded by the elasto sheet retaining rings 42 which has a stub ring 42C mating tight fit to receive the stem of suction cup 25 wherein the suction cups hold the primary ray shield sheet 21A into a close attachment to the vehicle window. The ray shield may comprise film materials including paper and linen cloth which includes knitted fabric.

While in order to comply with the statute, the invention has been described in language more or less specific as to structural features, it is to be understood that the invention is not limited to the specific features shown, but that the means and construction herein disclosed comprises the preferred form of several modes of putting the invention into effect, and the invention is therefore legitimate and valid scope of the applied claims.

*ADDENDUM
ABSTRACT OF THE LEGEND TERMINOLOGY

| Legend | Terminology | Abstract |
| --- | --- | --- |
| 21 | Ray-shield sheet | A sheet or film made of common materials including but not limited to paper linen cloth or resilient material to be used for ray interception, and/or heat inhibition or conservation, and/or art exhibition, and/or advertisement purposes. |
| 21A | Primary ray-shield sheet | A ray-shield sheet 21 which can sustain its weight against the gravitational force when installed on the glass surface with the attachments described in this invention. |
| 21A' | Linen cloth ray-shield sheet | A primary ray-shield sheet 21A specifically made of linen cloth including knitted fabric or equivalent material. |
| 21B | Secondary ray-shield sheet | A ray-shield sheet 21 which has to be pasted or taped onto the primary ray-shield sheet 1A for usage as a double layered ray-shield sheet. |
| 22 | Suction cup | |
| 22A | Suction cup stem | |
| 22B | Eye of suction cup stem | |

-continued

*ADDENDUM
ABSTRACT OF THE LEGEND TERMINOLOGY

| Legend | Terminology | Abstract |
|---|---|---|
| 23 | Building window glass | |
| 23A | Automobile windshield | |
| 24 | Building window frame | |
| 25 | Suction cup for elasto sheet retain ring 42 | |
| 26 | Tapping cap | |
| 26A | Lip of tapping cap | |
| 26B | Tapping tube | |
| 27 | Holes of ray-shield sheet 21 | |
| 28 | Sewing threads | |
| 29 | Lower margin of ray-shield 2 | |
| 30 | Velcloed weight bag | A fist size linen cloth or plastic bag tilled with weight chips such as iron balls, cobles, or beans to make the bag heavy and stable when sewed or zipped. On the bottom portion of the bag a strip of male Velcro is sewed or attached adhesively in order to mate a male strip of the Velcro attached to the bottom margin of ray-shield sheet 21 when used. |
| 31 | Male Velcro | Affixed to Velcro attached weight bag. |
| 32 | Female Velcro | Affixed to primary ray-shield sheet |
| 33 | Weight chips | Iron balls, cobles, beans etc. |
| 34 | Automobile dashboard | |
| 35 | Zipper or sawing threads | |
| 36 | Upper margin of ray-shield 21 | |
| 38 | Left margin of ray-shield 21 | |
| 39 | Right margin of ray-shield 21 | |
| 42 | Elasto sheet retaining ring | A voltex shaped cross sectional plastic cylinder which retains and directs the transparent resilient ray-shield sheet in a close contacting position against the windshield when pressed by means of a suction cup attachement, with a stem of suction cup being inserted tight fitting to the stub ring 42C at the rear flat surface of a leaf plate 42A. |
| 42A | Elasto sheet retaining ring directing leaf plat | |
| 42B | Elasto sheet retaining ring guiding triangular leaf plate | |
| 42C | Elasto sheet retaining ring stub ring for vacuum cup stem | |

I claim:

1. A ray-shield for releasingly attaching to a glass surface comprising:

a thin sheet of ray-shield material having a front surface for placement adjacent to the inner surface of said glass surface and a back surface on the side opposite to said inner surface;

a plurality of spaced apart apertures positioned around at least a portion of the periphery of said thin sheet of ray-shield material, said apertures spaced from the edges of said thin sheet of ray-shield material toward each other;

suction cups equal in number to said apertures for securing said thin sheet of ray-shield material to said glass surface comprising an integrally formed resilient cup and stem portion, said stems are formed as an integral extension of said cup, said stem passes through said apertures from said inner surface and terminate slightly beyond said back surface, and said stems having a close fit in said apertures; and resilient securing means for frictionally gripping of said stem after passing said stem through one of said plurality of apertures thereby securing said suction cup to said thin sheet of ray-shield material.

2. The ray-shield as defined in claim 1 wherein said plurality of apertures are positioned along the top and sides of said thin sheet of ray-shield material.

3. The ray-shield as defined in claim 1 wherein said resilient securing means is an open tube with sufficient length and thickness to extend over said stem and press against said back surface of said thin sheet of ray-shield material.

4. The ray-shield as defined in claim 1 wherein said resilient securing means is a closed cap with a peripheral lip which rides against said back surface of said thin sheet of ray-shield material.

5. The ray-shield as defined in claim 1 wherein said resilient securing means is an open tube with a tube thickness which rides against said back surface of said thin sheet of ray-shield material.

6. The ray-shield of claim 1 additionally comprising an eye means at the distal end of said stem portion for attaching said resilient securing means to said thin sheet of ray-shield material.

7. The ray-shield of claim 2 additionally comprising pliable weights attached to the bottom surface of said thin sheet of ray-shield material which rest on a supporting surface for holding said thin sheet of ray-shield material adjacent to the inner surface of said glass surface.

8. The ray-shield as defined in claim 7 wherein said pliable weights are bags with a zippered opening filled with a plurality of selected small items having weight.

9. The ray-shield as defined in claim 7 wherein said pliable weights are attached to said thin film sheet by Velcro type securing means comprising a first and second interlocking portion, a first portion of said Velcro attachment means is attached to said thin sheet of ray-shield material and a second portion of said Velcro attachment means is attached to said pliable bag.

10. The ray-shield as defined in claim 1 wherein said thin sheet of ray-shield material is rolled at both ends and retained in a rolled condition by sheet retaining ring means for forming a rigid vertical supporting column and said thin film sheet is held in position and against said glass surface by said resilient sheet retaining rings attached to said glass surface by suction cups.

11. The ray-shield as defined in claim 10 wherein said thin sheet of ray-shield material is plastic.

12. The ray-shield as defined in claim 11 wherein said resilient film is plastic.

* * * * *